United States Patent
Lopian

(10) Patent No.: US 10,089,218 B2
(45) Date of Patent: *Oct. 2, 2018

(54) METHODS CIRCUITS APPARATUSES SYSTEMS AND ASSOCIATED COMPUTER EXECUTABLE CODE FOR GENERATING A SOFTWARE UNIT TEST

(71) Applicant: TYPEMOCK LTD., Tel Aviv (IL)

(72) Inventor: Eli Lopian, Tel Aviv (IL)

(73) Assignee: TYPEMOCK LTD., Tel Aviv (IL)

(*) Notice: Subject to any disclaimer, the term of this patent is extended or adjusted under 35 U.S.C. 154(b) by 119 days.

This patent is subject to a terminal disclaimer.

(21) Appl. No.: 15/209,847

(22) Filed: Jul. 14, 2016

(65) Prior Publication Data

US 2017/0132116 A1 May 11, 2017

Related U.S. Application Data

(63) Continuation-in-part of application No. 14/216,911, filed on Mar. 17, 2014, now Pat. No. 9,396,097.

(60) Provisional application No. 61/802,692, filed on Mar. 17, 2013.

(51) Int. Cl.
*G06F 9/44* (2018.01)
*G06F 11/36* (2006.01)

(52) U.S. Cl.
CPC ........ *G06F 11/3684* (2013.01); *G06F 11/368* (2013.01)

(58) Field of Classification Search
CPC . G06F 11/3684; G06F 11/3672; G06F 11/368
See application file for complete search history.

(56) References Cited

U.S. PATENT DOCUMENTS

| | | | | |
|---|---|---|---|---|
| 5,673,387 A * | 9/1997 | Chen | ................... | G06F 11/3676 707/999.202 |
| 6,134,690 A * | 10/2000 | Ivaturi | ................ | G06F 11/2294 714/46 |
| 6,463,582 B1* | 10/2002 | Lethin | ................. | G06F 9/45504 717/138 |
| 7,392,507 B2* | 6/2008 | Kolawa | ............... | G06F 11/3624 714/E11.209 |
| 8,127,275 B1* | 2/2012 | Hampapuram | ..... | G06F 11/3672 714/38.1 |
| 8,276,123 B1* | 9/2012 | Deng | .................. | G06F 11/3688 714/37 |
| 8,352,923 B2* | 1/2013 | Lopian | ................ | G06F 11/3688 703/22 |

(Continued)

*Primary Examiner* — Marina Lee
(74) *Attorney, Agent, or Firm* — Vladimir Sherman; Professional Patent Solutions Ltd.

(57) ABSTRACT

Disclosed are methods, circuits, apparatuses, systems and associated computer executable code for generating a unit test. According to some embodiments, there is provided computerized system including test generation software, which software may include code analyzing logic to identify within a code under test or within an associated Code Statement Segment (CSS): (1) one or more dependencies, and (2) one or more fields read by the CUT or Associated CSS. The may also be include a code statement provider to provide: (1) at least one CSS constructed to resolve at least one identified dependency, and (2) at least one CSS constructed to modify at least one identified field.

11 Claims, 6 Drawing Sheets

(56) References Cited

U.S. PATENT DOCUMENTS

| | | | | |
|---|---|---|---|---|
| 8,627,296 B1* | 1/2014 | Picard | ................. | G06F 11/3684 |
| | | | | 717/124 |
| 9,396,097 B2* | 7/2016 | Lopian | ................. | G06F 11/3684 |
| 2007/0033576 A1* | 2/2007 | Tillmann | ............ | G06F 11/3688 |
| | | | | 717/124 |
| 2007/0157169 A1* | 7/2007 | Chen | ......................... | G06F 8/74 |
| | | | | 717/120 |
| 2008/0307397 A1* | 12/2008 | Angell | .................... | G06F 9/455 |
| | | | | 717/131 |
| 2010/0037100 A1* | 2/2010 | Lopian | ................. | G06F 11/3688 |
| | | | | 714/35 |
| 2011/0145788 A1* | 6/2011 | Xu | ......................... | G06F 11/368 |
| | | | | 717/121 |
| 2012/0030654 A1* | 2/2012 | Park | .................... | G06F 11/3684 |
| | | | | 717/124 |
| 2012/0266135 A1* | 10/2012 | Mansour | ............. | G06F 11/3648 |
| | | | | 717/124 |
| 2013/0061210 A1* | 3/2013 | Chung | ................. | G06F 11/3664 |
| | | | | 717/125 |
| 2014/0289708 A1* | 9/2014 | Lopian | ................. | G06F 11/3684 |
| | | | | 717/124 |
| 2017/0132116 A1* | 5/2017 | Lopian | ................. | G06F 11/3684 |

* cited by examiner

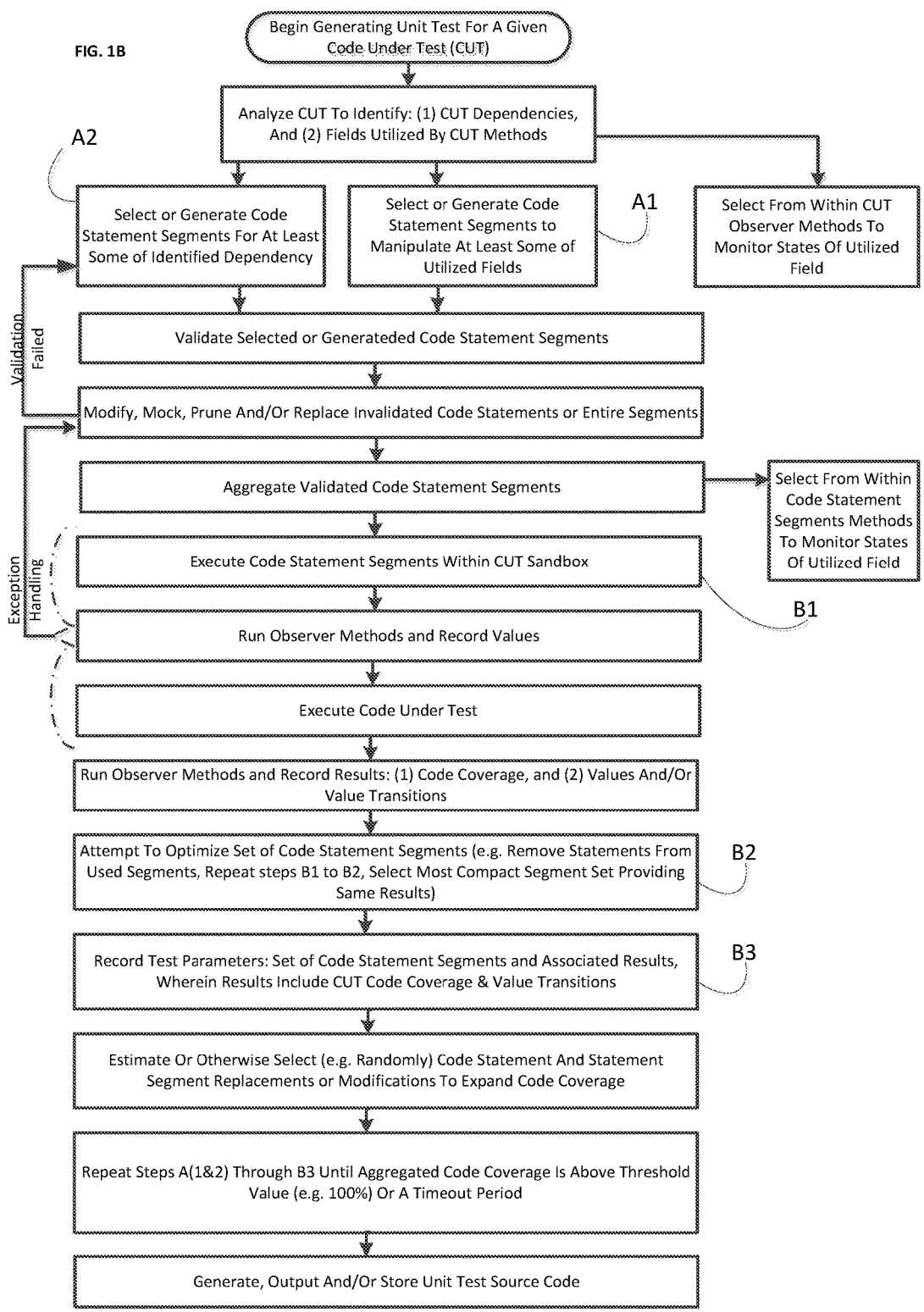

METHODS CIRCUITS APPARATUSES SYSTEMS AND ASSOCIATED COMPUTER EXECUTABLE CODE FOR GENERATING A SOFTWARE UNIT TEST

RELATED APPLICATIONS

The present application is a Continuation in Part of U.S. patent application Ser. No. 14/216,911, filed by the inventors of the present invention on Mar. 17, 2014, titled "Methods, Circuits, Devices, Systems and Associated Computer Executable Code for Testing Software Code" and patented on Jul. 19, 2016 (U.S. Pat. No. 9,396,097);

Which in turn claims priority from U.S. Provisional Patent Application No. 61/802,692 filed by the inventors of the present invention on Mar. 17, 2013, titled "Methods Circuits Apparatuses Systems and Associated Computer Executable Code for Generating Sustainable Unit Tests";

both of which are hereby incorporated by reference into the present Application in their entirety.

FIELD OF THE INVENTION

The present invention relates generally to the field of software development and testing. More specifically, the present invention relates to methods, circuits, apparatuses, systems and computer executable code for generating a software unit test.

BACKGROUND

Validating software is a complex problem that grows exponentially as the complexity of the software grows. Even a small mistake in the software can result in a large financial cost. In order to cut down on these costs, responsible software companies test each software component as they are developed or during interim stages of development. Ideally, these tests are would be automatic, fast, insolated and run continuously so as to detect any and all possible code defects early on.

In computer programming, unit testing is a method by which individual units of source code, sets of one or more computer program modules together with associated control data, usage procedures, and operating procedures are tested to determine if they are fit for use. Intuitively, one can view a unit as the smallest testable part of an application. In procedural programming, a unit could be an entire module, but it is more commonly an individual function or procedure. In object-oriented programming, a unit is often an entire interface, such as a class, but could be an individual method. Unit tests are short code fragments created by programmers or occasionally by white box testers during the development process.

Ideally, each test case is independent from other test cases. Substitutes such as method stubs, mock objects, fakes, and test harnesses can be used to assist testing a module in isolation. Unit tests are typically written and run by software developers to ensure that code meets its design and behaves as intended, even under unanticipated conditions. Writing these unit tests, however, is time and resource consuming, and thus often overly burdensome to be performed thoroughly and completely.

Testing will rarely catch every error in a program, since it mostly likely will not evaluate every execution path in any but the most trivial programs. The same is true for unit testing. Unit testing by definition only tests the functionality of the units themselves. Therefore, it will not catch integration errors or broader system-level errors (such as functions performed across multiple units, or non-functional test areas such as performance). Unit testing should be done in conjunction with other software testing activities, as they can only show the presence or absence of particular errors; they cannot prove a complete absence of errors. In order to guarantee correct behavior for every execution path and every possible input, and ensure the absence of errors, other techniques are required, namely the application of formal methods to proving that a software component has no unexpected behavior.

Another challenge related to writing the unit tests is the difficulty of setting up realistic and useful tests. It is necessary to create relevant initial conditions so the part of the application being tested behaves like part of the complete system. If these initial conditions are not set correctly, the test will not be exercising the code in a realistic context, which diminishes the value and accuracy of unit test results.

Today, to obtain intended benefits from unit testing, rigorous discipline is needed throughout the software development process. It is essential to keep careful records not only of the tests that have been performed, but also of all changes that have been made to the source code of this or any other unit in the software. Use of a version control system is essential. If a later version of the unit fails a particular test that it had previously passed, the version-control software can provide a list of the source code changes (if any) that have been applied to the unit since that time. It is also essential to implement a sustainable process for ensuring that test case failures are reviewed daily and addressed immediately. If such a process is not implemented and ingrained into the team's workflow, the application will evolve out of sync with the unit test suite, increasing false positives and reducing the effectiveness of the test suite.

There is therefore a need to automate such test generation processes. It is desirable to have improved methods, circuits, apparatuses, systems and computer executable code for generating software unit tests in a substantially automated manner.

SUMMARY OF THE INVENTION

The present invention includes methods, circuits, apparatuses, systems and associated computer executable code for providing a unit test for software code, which software code may be referred to as code under test (CUT). The invention may include substantially automatic methods and systems for generating sustainable unit tests. According to some embodiments, sustainable unit tests may be isolated and may produce the same or similar results in any environment. Unit tests according to embodiments may be optimized, fast to run, and robust with relatively low false negative results. Unit test isolation according to embodiments may be performed in accordance with the teachings of U.S. Pat. No. 8,352,923, which is hereby incorporated by reference in its entirety, and may enable writing unit tests, without changing or altering the production code.

According to embodiments, there may be provided a computerized system for substantially automatically generating a unit test, wherein the unit test may be at least partially composed of one or more code statements, wherein related code statements within a unit test may be organized into code statement segments (CSS). According to embodiments, at least one code statement of a given CSS may function to resolve a dependency within the CUT, while one or more other code statements within the given CSS may function to support execution of the dependency resolving code statement, such that the CSS may be referred to as CUT dependency resolving CSS. According to further embodiments, at least one code statement of another given CSS may function to write, directly or indirectly, to a field read or otherwise utilized by the CUT, directly or indirectly, while one or more other code statements within the other given CSS may function to support execution of the field writing/manipulating/modifying code statement. Some CSS's according to embodiments may perform both a dependency resolving function and a field modifying function.

Code execution processing logic or modules functionally associated with the CUT sandbox may execute the CUT and one or more CSS's. One or more observer methods, also being executed within the CUT sandbox, may observe, directly or indirectly, one or more fields written to by the CUT, directly or indirectly, during execution. Code execution assessment logic or modules may detect or assess one or more parameters relating to execution of the CUT, CSS's and Observer Methods.

According to embodiments, a unit test may be compiled by iteratively generating and/or selecting CSS's to add to a (stored) set of CSS's. At least some of the generated or selected CSS's may be checked for code (execution) coverage relevance, and may optionally be optimized, before being added to the set of CSS's. Once CUT code execution coverage provided by the set of stored CSS's is assessed to have reached or exceeded a threshold level (e.g. 100%), the set may be published or otherwise provided as at least part of a software unit test.

According to embodiments, there may be provided a computerized system including a processor and operating memory sufficient to facilitate or otherwise support a computer operating system and a code execution sandbox running within the operating system. There may be provided code analyzing logic adapted to identify within the CUT or within an associated Code Statement Segment (CSS): (1) one or more dependencies, and (2) one or more fields read by the CUT or Associated CSS. There may also be provided a code statement provider (e.g. a CSS generator adapted to provide: (1) at least one CSS constructed to resolve at least one identified dependency, and (2) at least one CSS constructed to modify at least one identified field. The system also include an observer method controller to identify within the CUT, and optionally within any CSS, an observer method, which observer method indicates a value associated with a field written to by the CUT by a CSS.

According to further embodiments, the system may include code execution processing/logic or module to execute within the sandbox environment the: (1) CUT, (2) CSS, and (3) an observer method. Code execution assessment logic may observe or otherwise assess one or more functional parameters of the CUT and the CSS during execution, for example: (1) code execution errors, (2) code execution exceptions, (3) values of data objects such as variables or fields, (4) value transitions of data objects such as variables or fields, and (5) code execution coverage.

The system may include validation logic adapted to validate a CSS for use as part of a unit test. The code statement generator may be adapted to operate in concert with the validation logic to modify, replace, add isolation code or prune a CSS responsive to an output of the code execution assessment logic, for example when based on the output the validation logic determines a given CSS is either faulty or fails to perform its intended function.

The system may include code statement segment optimization logic adapted to operate in concert with the code statement generator to modify, replace, add isolation code or prune a CSS responsive to observer method outputs. The optimization logic may attempt to minimize code statements within a segment while maintaining substantially identical code execution coverage and/or substantially identical field modifications. The system may include code statement segment storage adapted to store CSS's which have been validated or optimized.

The system may include test coverage assessment logic adapted to assess a cumulative code execution coverage provided by the stored code statement segments, and a unit test publishing module of the system may be adapted to publish the stored code statement segments as a unit test upon the assessed cumulative code execution coverage reaching or exceeding a threshold level.

The code statement provider may provide a code statement segment by generating or constructing the CSS to either resolve an identified dependency or to modify at least one identified field. The code statement provider may provide a code statement segment by selecting a CSS stored in said storage and known to either resolve the identified dependency or to modify the identified field.

In situations where a CSS to provide an intended function, either resolving a dependency or modifying a field, cannot be selected or generated, the intended code function or behavior may be mocked by a mocking engine. One or more mocking engines of the system may provide mocked behavior, either to a portion of the CUT or to a portion of the CSS, through isolation code which be linked or weaved therein.

Various processing functions, logic or modules described above may be provided by one or more discrete processing units, modules or components. Additionally, various processing functions, logic or modules described above may be provided by a system controller or system control logic.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1B is a flowchart including steps or functions which may be performed by a system according to embodiments of the present invention in order to generate a unit test composed of sets of code statement segments;

Figure 1A:
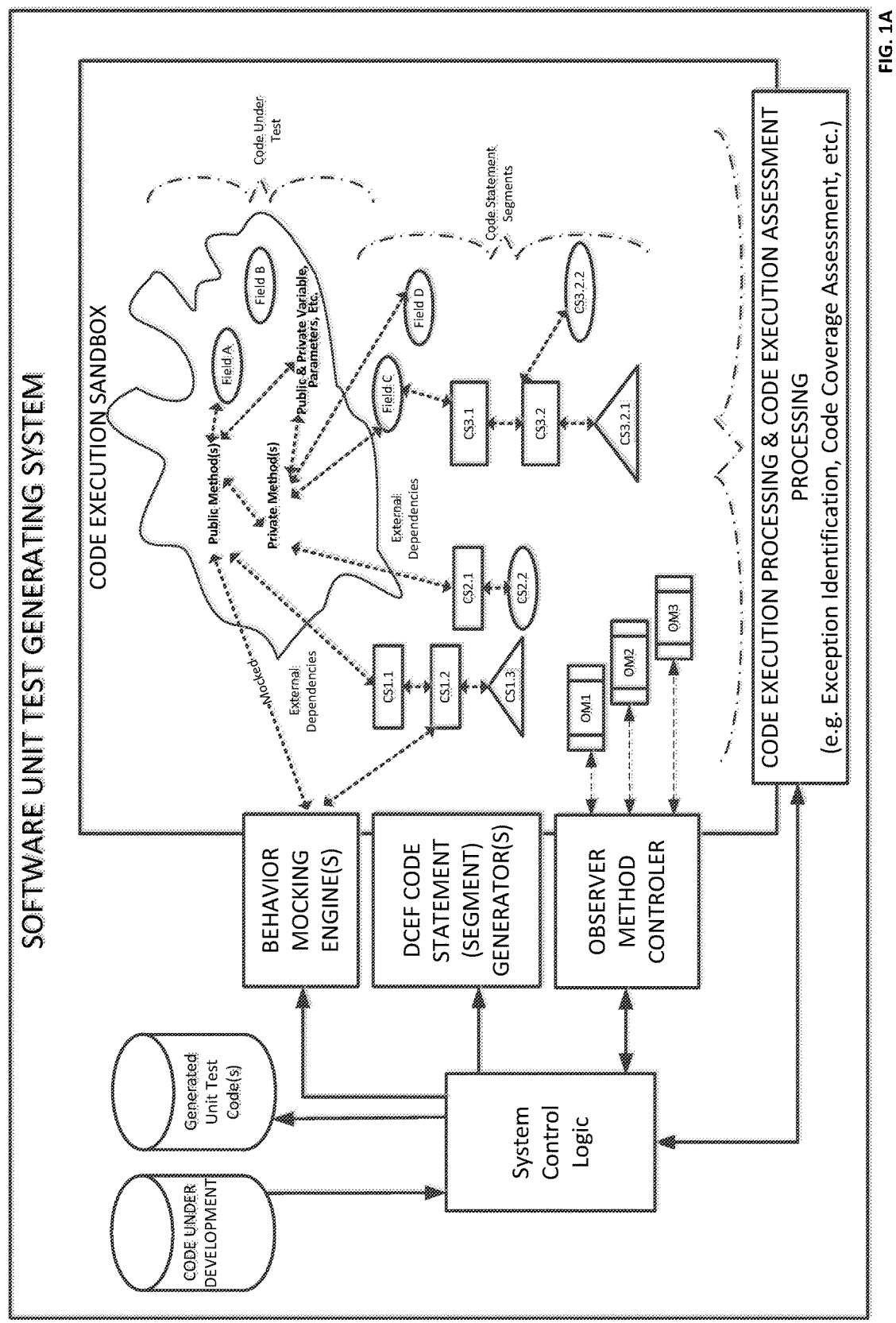
FIG. 1A is a functional block level diagram of an exemplary unit test generating system, according to some embodiments of the present invention, wherein the system includes a code execution sandbox, a code statement segment generator, a behavior mocking engine, an observer controller, and system control logic.

It will be appreciated that for simplicity and clarity of illustration, elements shown in the figures have not necessarily been drawn to scale. For example, the dimensions of some of the elements may be exaggerated relative to other elements for clarity. Additionally, processing related functions or logic described anywhere in the specification and attributed to a given unit, module or other functional block may be performed by one or more of the processing related elements shown herein. Functions attributed anywhere in the specification to any combination of multiple processing related units, modules or functionally blocks may be performed by a single processing related element shown in the herein. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more units, modules or embodiments may be combined with, or may be utilized in various combination with one or more other functions, operations, components and/or features described herein with reference to one or more other units, modules or embodiments.

The present invention may include methods, circuits, apparatuses, systems and associated computer executable code for providing a unit test relating to software application code and code. According to embodiments a portion of application code to be tested, herein after referred to as Code Under Test (CUT). The CUT may include, for example, (1) a class including a public method and all of the class's private methods, and/or (2) at least one private method not executable through a public method call. The CUT may be copied to and optionally instanced and/or executed within an execution sandbox, which execution sandbox may include or be functionally associated with a Dynamically Constructed Code Execution Framework (DCCEF). The DCCEF may include storage for one or more segments or chains of Code Statement (Code Statement Segments) intended to facilitate or otherwise support execution of the CUT. The DCCED may also include: (1) a code statement segment provider, (2) observer method controller/logic, (3) a code behavior mocking engine, and (4) a controller or control logic to coordinate operation of all the DCCEF functional blocks and to provide various processing and assessment function required to generate, select, validate, optimize, aggregate, store and publish CSS's as part of a unit test.

A computerized Unit Test Generating Systems according to embodiments may be used to generate for each CUT one or more DCCEF's, or multiple versions of a given DCCEF. According to further embodiments, DCCEF generation may involve the use of iterative algorithms for a process of Code Statement Segment (CSS) construction, CSS validity testing, CSS modification and CSS pruning, wherein a target of the iterative algorithms is to produce a set of CSS which will maximize CUT execution coverage during testing.

According to some embodiments, each form of a DCCEF may be interactively/automatically constructed, one CSS at a time, according to a multiphase CSS building methodology or algorithm which include: (1) analyzing the CUT to identify at least one dependency, for example on a code object or code message, such as: (a) argument, (b) constructor, and (c) a parameter of an argument, (d) static dependencies, and (e) resources; (2) for at least one identified dependency instancing a corresponding code segment to provide the code object; (3) for each instanced corresponding code segment, identifying dependencies on additional successive code objects; (4) instancing additional successive code statements to produce the additional objects; and (5) recursively repeating steps 3 and 4 until an independently functioning code statement is instanced for each of the CSS branches. Steps 1 through 5 may be repeated to generate or instance a CSS for each dependency identified in the CUT.

According to further embodiments, an assessment of CUT code coverage may be performed along with execution of the CUT using a given DCCEF form. Code coverage may be defined as an extent of code execution responsive to the CSS which was activated, executed or otherwise performed some function during execution of the CUT. Identification of CUT instructions not fully activated or executed during CUT execution with one or more DCCEF forms may be used to select which one or more CSS's to modify or include in a subsequently generated DCCEF form. Accordingly, DCCEF forms may be recursively generated, regenerated and improved until either a single or a combination of DCCEF forms results in maximal/complete CUT code coverage during CUT execution.

According to embodiments, CUT field dependencies (i.e. fields read by CUT methods, directly or indirectly) may be determined/identified and a given DCCEF form may be generated and/or modified/morphed in order to modify/toggle the depended upon fields. Selection criteria for CSS may include field modification/toggling characteristics.

According to some embodiments, generating code statement segments for unit tests may include generating code statement segments designed to modify one or more fields identified as depended upon by the CUT (see 130B in FIG. 1B) and/or pass arguments identified as depended upon by the CUT. A field may be read by the CUT either directly or indirectly and either may create a dependency on the field. An argument may be required for a CSS method call statement, for example. According to some embodiments, types of the depended upon fields/arguments may first be determined in order to determine a type of value suitable for the field/argument. A replacement value of a suitable type to replace the existing field/argument value may then be selected for each field to be modified, and the code statement segments designed accordingly to modify the field to the selected replacement value during the execution of the unit test and/or pass the replacement argument to the method.

According to some embodiments, replacement values for depended upon fields/arguments may be selected from a pre-defined list, randomly and/or from a list of values/constants of the appropriate type appearing in the CUT its metadata and its dependencies. According to further embodiments, selection of replacement values/constants for depended upon fields/arguments may be selected/prioritized from within one or more of the above lists based upon one or more heuristics. Exemplary heuristics that may be applicable to replacement constant selection may include:

a. replacement values/constants may be selected/prioritized based on an amount of appearances of each value/constant within the CUT and/or within the CSS's;

b. replacement values/constants may be selected/prioritized based on an amount of appearances of each value/constant within a CSS associated with the particular field in question or within a portion of the CUT being tested;

c. replacement values/constants may be selected/prioritized based on a proximity/similarity to the type of the field in question;

d. replacement values/constants may be selected/prioritized based on an assessment of a coverage sensitivity associated with each value/constant. According to some embodiments, coverage sensitivity may be assessed based on a proximity and/or similarity between the usage of a value/constant within the CUT, and/or its dependencies, and a code statement of the CUT which was/is not called in previous/other unit tests. According to further embodiments, coverage sensitivity may be further assessed based on a proximity and/or similarity between the given value/constant being examined and a first code statement of the CUT of a block not called in previous/other unit tests. According to yet further embodiments, coverage sensitivity may be further assessed based on a proximity and/or similarity between the given value/constant being examined and a last code statement of the CUT of a block called in previous/other unit tests. The coverage of a CUT can be represented as a list of sequential code statements, some called and some not. These can then be sorted into blocks of called code and uncalled code. The values/constants that are closer to the edges of blocks (i.e. first statements of the uncalled blocks and/or last statements of called blocks) may be estimated to be branching statements and thus of higher priority (having a higher level of coverage sensitivity).

The following table presents an exemplary sorting of code lines of a CUT into Blocks of called and un-called statements:

| Called | Code | Block | Importance | Constant |
|---|---|---|---|---|
| Yes | int a = 1; | 1 | Med | 1 |
| Yes | if (b == 10) { | 1 | High | 10 |
| No | b= 12; | 2 | Med | 12 |
| No | a = 11; } else { | 2 | Low | 11 |
| Yes | return; } | 3 | Low | |

As can be seen, in this exemplary code, Block 2 is uncalled, and the statement if (b==10) is a conditional statement near the edge of Block 2. Therefore, values/constants similar and/or in proximity to this statement will be considered to have coverage sensitivity in this example.

The following table presents another exemplary sorting of code lines of a CUT into Blocks of called and un-called statements:

| Called | Code | Block | Importance | Constant |
|---|---|---|---|---|
| Yes | int a = 1; | 1 | High | 1 |
| Yes | if (b == a) { | 1 | | |
| No | b= 12; | 2 | Med | 12 |
| No | a = 11; } else { | 2 | Low | 11 |
| Yes | return; } | 3 | Low | |

As can be seen, in this exemplary code, Block 2 is uncalled, and the statement if (b==a) is a conditional statement near the edge of Block 2. As there is no constant the previous statement a=1 gets a higher priority. Therefore, values/constants similar and/or in proximity to this statement will be considered to have coverage sensitivity in this example.

The present invention includes methods, circuits, apparatuses, systems and associated computer executable code for providing a unit test for software code, which software code may be referred to as code under test (CUT). The invention may include substantially automatic methods and systems for generating sustainable unit tests. According to some embodiments, sustainable unit tests may be isolated and may produce the same or similar results in any environment. Unit tests according to embodiments may be optimized, fast to run, and robust with relatively low false negative results. Unit test isolation according to embodiments may be performed in accordance with the teachings of U.S. Pat. No. 8,352,923, which is hereby incorporated by reference in its entirety, and may enable writing unit tests, without changing or altering the production code.

According to embodiments, there may be provided a computerized system for substantially automatically generating a unit test, wherein the unit test may be at least partially composed of one or more code statements, wherein related code statements within a unit test may be organized into code statement segments (CSS). According to embodiments, at least one code statement of a given CSS may function to resolve a dependency within the CUT, while one or more other code statements within the given CSS may function to support execution of the dependency resolving code statement, such that the CSS may be referred to as CUT dependency resolving CSS. According to further embodiments, at least one code statement of another given CSS may function to write, directly or indirectly, to a field read or otherwise utilized by the CUT, directly or indirectly, while one or more other code statements within the other given CSS may function to support execution of the field writing/manipulating/modifying code statement. Some CSS's according to embodiments may perform both a dependency resolving function and a field modifying function.

Code execution processing logic or modules functionally associated with the CUT sandbox may execute the CUT and one or more CSS's. One or more observer methods, also being executed within the CUT sandbox, may observe, directly or indirectly, one or more fields written to by the CUT, directly or indirectly, during execution. Code execution assessment logic or modules may detect or assess one or more parameters relating to execution of the CUT, CSS's and Observer Methods.

According to embodiments, a unit test may be compiled by iteratively generating and/or selecting CSS's to add to a (stored) set of CSS's. At least some of the generated or selected CSS's may be checked for code (execution) coverage relevance, and may optionally be optimized, before being added to the set of CSS's.

According to some embodiments, in order to improve testing (e.g. to improve testing coverage) one or more unit tests (or Code Statement Segments (CSSs) as described herein, designed to facilitate unit tests) may be mutated to provide further testing/coverage [see step 230 of FIG. 1B]. According to some embodiments, mutation of unit tests may be performed after the unit tests being modified have been run successfully and we have a unit test with assertions. Mutation of the unit tests may be performed by modifying values/constants used within CSSs of the unit tests being mutated (e.g. as arguments, populating fields, as variables etc.).

According to some embodiments, replacement values/constants for mutating unit tests may be selected from a pre-defined list, randomly and/or from a list of values/constants of the appropriate type appearing in the CUT and/or CSSs. According to further embodiments, selection of replacement values/constants for mutating unit tests may be selected/prioritized from within one or more of the above lists based upon one or more heuristics. Exemplary heuristics that may be applicable to replacement value/constant selection may include:
  a. replacement values/constants may be selected/prioritized based on an amount of appearances of each value/constant within the CUT and/or within the CSS's;
  b. replacement values/constants may be selected/prioritized based on an amount of appearances of each value/constant within a CSS associated with the particular CSS in question or within a portion of the CUT being tested;
  c. replacement values/constants may be selected/prioritized based on a proximity/similarity to the type of a field/argument in question;
  d. replacement values/constants may be selected/prioritized based on an assessment of a coverage sensitivity associated with each value/constant. According to some embodiments, coverage sensitivity may be assessed based on a proximity and/or similarity between the usage of a value/constant within the CUT, and/or its dependencies, and a code statement of the CUT which was/is not called in previous/other unit tests. According to further embodiments, coverage sensitivity may be further assessed based on a proximity and/or similarity between the given value/constant being examined and a first code statement of the CUT of a block not called in previous/other unit tests. According to yet further embodiments, coverage sensitivity may be further assessed based on a proximity and/or similarity between the given value/constant being examined and a last code statement of the CUT of a block called in previous/other unit tests. The coverage of a CUT can be represented as a list of sequential code statements, some called and some not. These can then be sorted into blocks of called code and uncalled code. The values/constants that are closer to the edges of blocks (i.e. first statements of the uncalled blocks and/or last statements of called blocks) may be estimated to be branching statements and thus of higher priority (having a higher level of coverage sensitivity).

After a set of mutations has been created, the tests may be executed again to observe and assess coverage including the mutated tests.

Once CUT code execution coverage provided by the set of stored CSS's is assessed to have reached or exceeded a threshold level (e.g. 100%), the set may be published or otherwise provided as at least part of a software unit test.

According to embodiments, there may be provided a computerized system including a processor and operating memory sufficient to facilitate or otherwise support a computer operating system and a code execution sandbox running within the operating system. There may be provided code analyzing logic adapted to identify within the CUT or within an associated Code Statement Segment (CSS): (1) one or more dependencies, and (2) one or more fields read by the CUT or Associated CSS. There may also be provided a code statement provider (e.g. a CSS generator adapted to provide: (1) at least one CSS constructed to resolve at least one identified dependency, and (2) at least one CSS constructed to modify at least one identified field. The system also include an observer method controller to identify within the CUT, and optionally within any CSS, an observer method, which observer method indicates a value associated with a field written to by the CUT by a CSS.

According to further embodiments, the system may include code execution processing/logic or module to execute within the sandbox environment the: (1) CUT, (2) CSS, and (3) an observer method. Code execution assessment logic may observe or otherwise assess one or more functional parameters of the CUT and the CSS during execution, for example: (1) code execution errors, (2) code execution exceptions, (3) values of data objects such as variables or fields, (4) value transitions of data objects such as variables or fields, and (5) code execution coverage.

The system may include validation logic adapted to validate a CSS for use as part of a unit test. The code statement generator may be adapted to operate in concert with the validation logic to modify, replace, add isolation code or prune a CSS responsive to an output of the code execution assessment logic, for example when based on the output the validation logic determines a given CSS is either faulty or fails to perform its intended function.

The system may include code statement segment optimization logic adapted to operate in concert with the code statement generator to modify, replace, add isolation code or prune a CSS responsive to observer method outputs. The optimization logic may attempt to minimize code statements within a segment while maintaining substantially identical code execution coverage and/or substantially identical field modifications. The system may include code statement segment storage adapted to store CSS's which have been validated or optimized.

The system may include test coverage assessment logic adapted to assess a cumulative code execution coverage provided by the stored code statement segments, and a unit test publishing module of the system may be adapted to publish the stored code statement segments as a unit test upon the assessed cumulative code execution coverage reaching or exceeding a threshold level.

The code statement provider may provide a code statement segment by generating or constructing the CSS to either resolve an identified dependency or to modify at least one identified field. The code statement provider may provide a code statement segment by selecting a CSS stored in said storage and known to either resolve the identified dependency or to modify the identified field.

In situations where a CSS to provide an intended function, either resolving a dependency or modifying a field, cannot be selected or generated, the intended code function or behavior may be mocked by a mocking engine. One or more mocking engines of the system may provide mocked behavior, either to a portion of the CUT or to a portion of the CSS, through isolation code which be linked or weaved therein.

Various processing functions, logic or modules described above may be provided by one or more discrete processing units, modules or components. Additionally, various processing functions, logic or modules described above may be provided by a system controller or system control logic.

Turning now to FIG. 1A, there is shown a functional block level diagram of an exemplary unit test generating system, according to some embodiments of the present invention, wherein the system includes a code execution sandbox, a code statement segment generator, a behavior mocking engine, an observer controller, and system control logic.

Turning now to FIG. 1B, there is shown a flowchart including steps or functions which may be performed by a system according to embodiments of the present invention in order to generate a unit test composed of sets of code statement segments. The steps include generation, validation, optimization and storage.

Figure 2A:
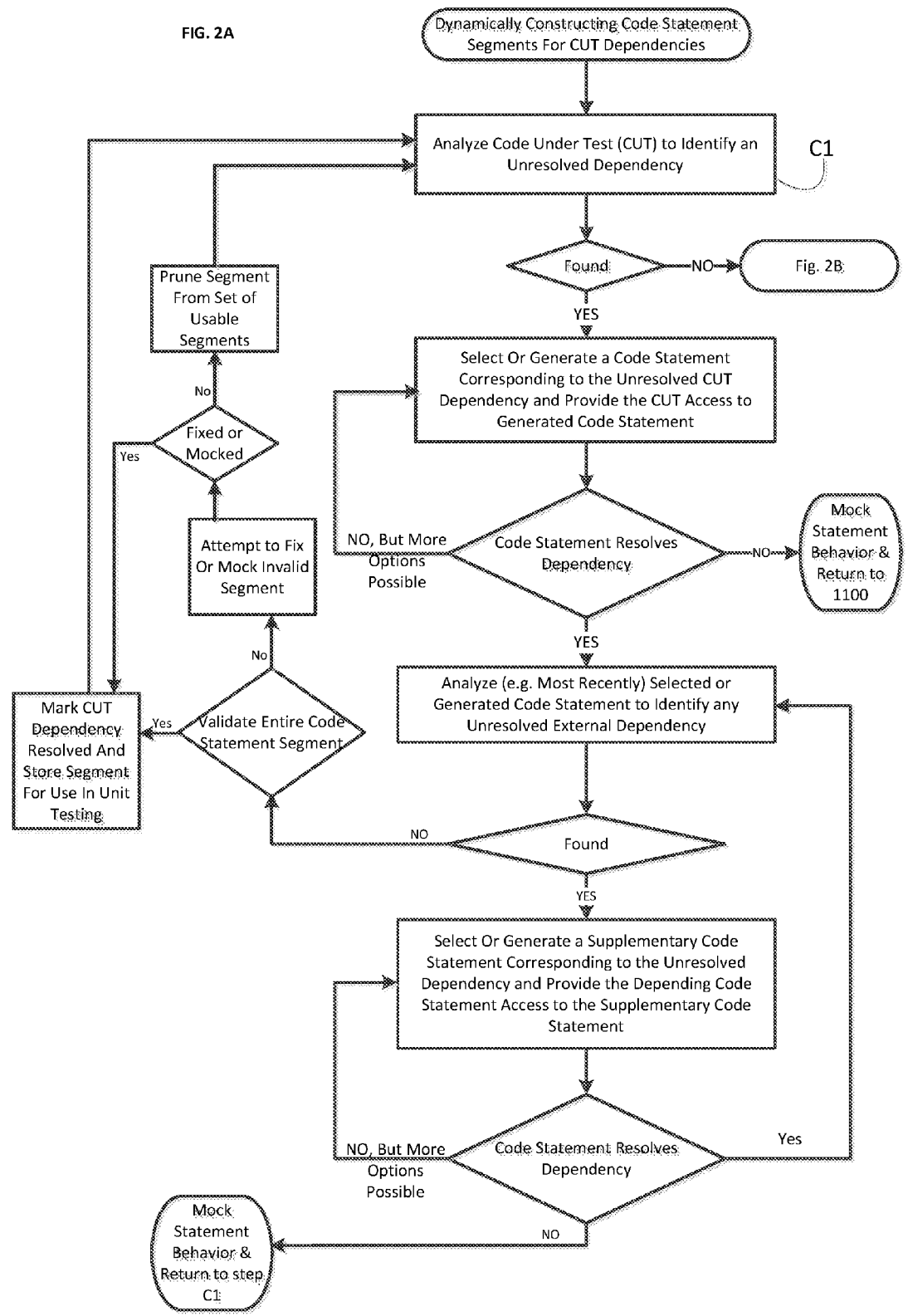
FIG. 2A is a flowchart including steps or functions which may be performed by a system according to embodiments of the present invention in order to generate dependency resolving code statement segments according to embodiments.

Turning now to FIG. 2A, there is shown a flowchart including steps or functions which may be performed by a system according to embodiments of the present invention in order to generate dependency resolving code statement segments according to embodiments. The steps include generation and validation of one or more generate CSS's.

Figure 2B:
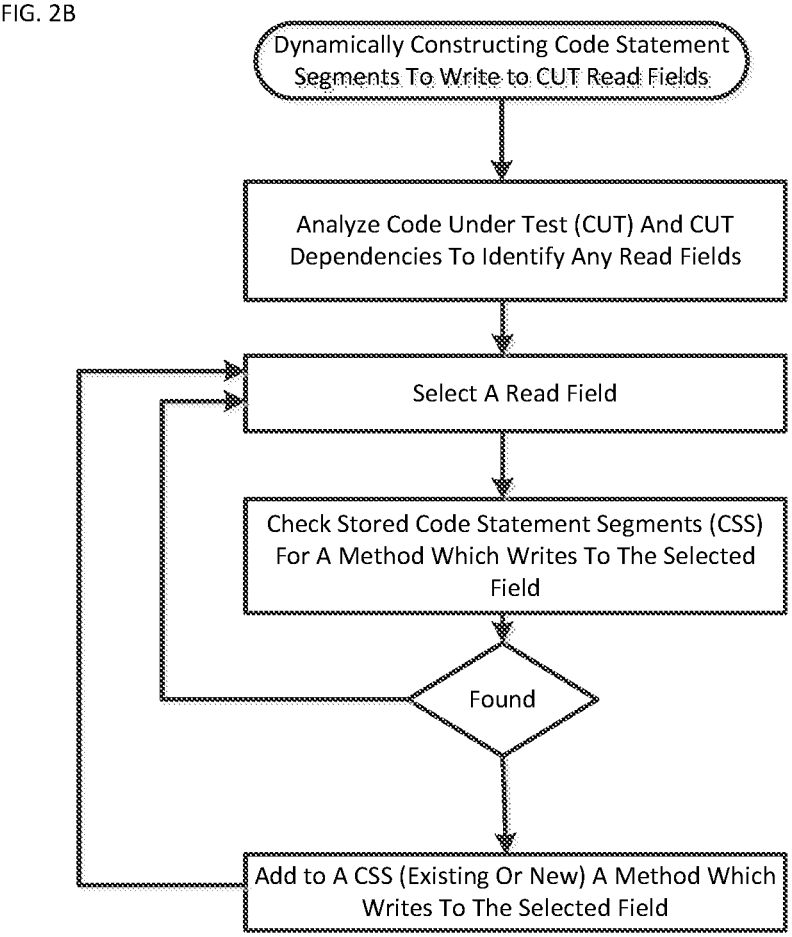
FIG. 2B is a flowchart including steps or functions which may be performed by a system according to embodiments of the present invention in order to generate field modifying code statement segments according to embodiments.

Turning now to FIG. 2B, there is shown a flowchart including steps or functions which may be performed by a system according to embodiments of the present invention in order to generate field modifying code statement segments according to embodiments. Field modifying statements are selected based on identified fields which the CUT reads, directly or indirectly, for example through a CSS.

Figure 2C:
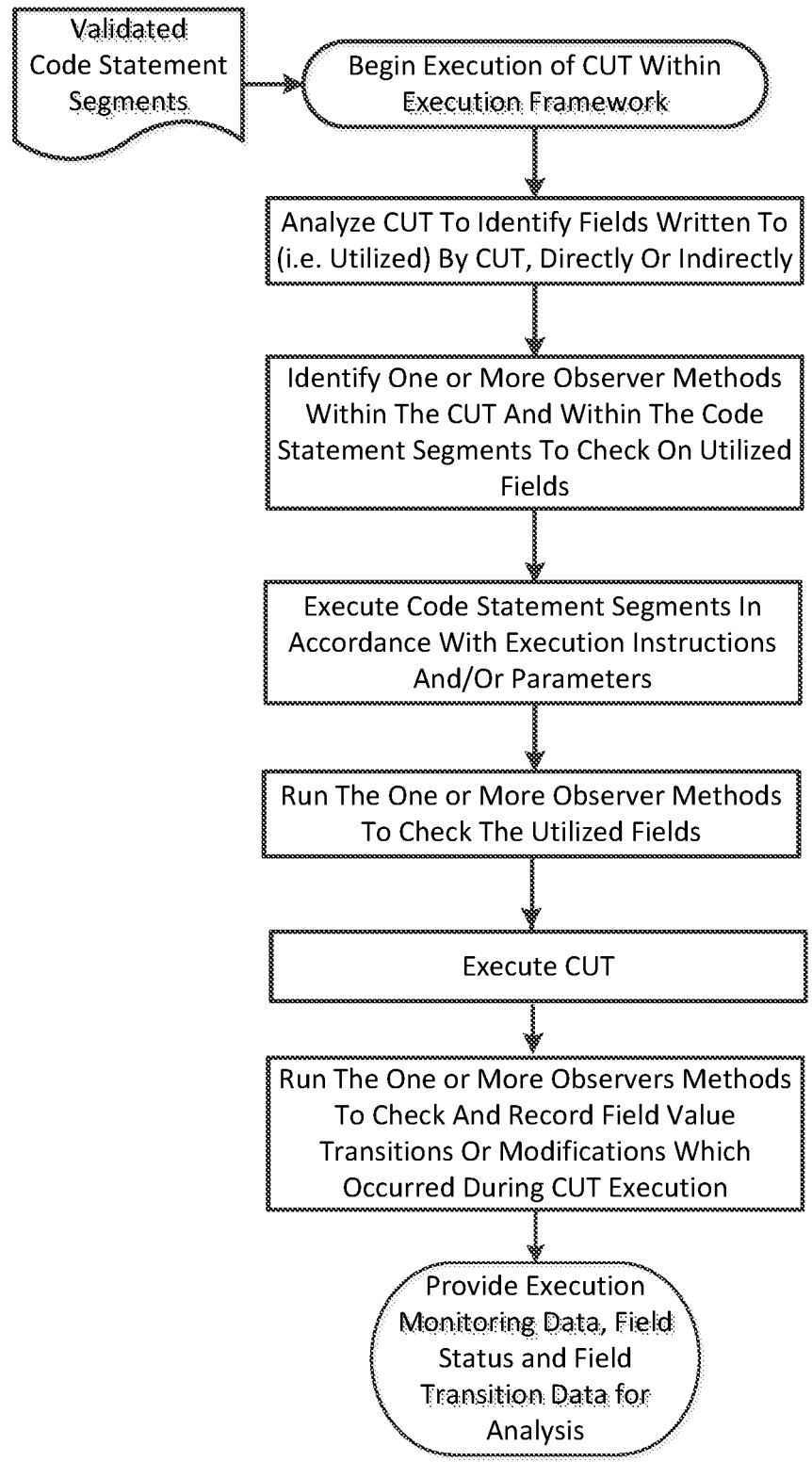
FIG. 2C is a flowchart including steps or functions which may be performed by a system according to embodiments of the present invention in order to assess relevance of generated code statement segments as part of a unit test according to embodiments.

Turning now to FIG. 2C, there is shown a flowchart including steps or functions which may be performed by a system according to embodiments of the present invention in order to assess relevance of selected or generated code statement segments for an intended CUT execution purpose as part of a unit test according to embodiments. CSS's which are assessed as relevant for an intended CUT execution purposed are stored for later use as part of a unit test.

Figure 2D:
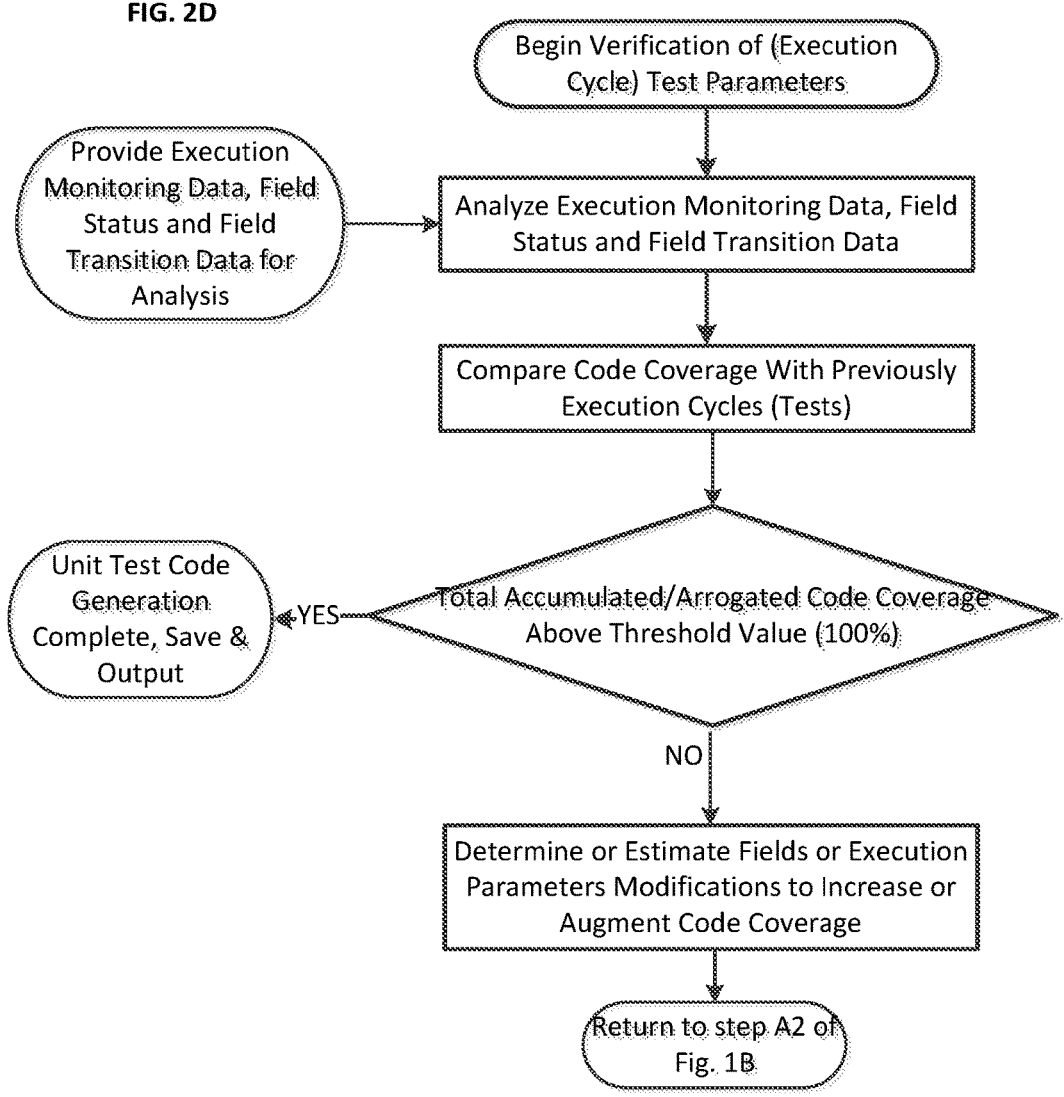
FIG. 2D is a flowchart including steps or functions which may be performed by a system according to embodiments of the present invention in order to assess with an accumulate set of code statement segments may be sufficient for providing as a unit test.

Turning now to FIG. 2D, there is shown a flowchart including steps or functions which may be performed by a system according to embodiments of the present invention in order to assess when an accumulate set of code statement segments may be sufficient for providing as a unit test. Assessment is based on cumulative or aggregated cover coverage of the CSS's validated and optionally optimized.

According to some embodiments, there may be provided a system for generating a unit test for software code to be tested (Code Under Test "CUT"), comprising a processor functionally associated with a digital memory, which digital memory stores processor executable code adapted to cause one or more processors to:

(i) analyze code instructions of the CUT or metadata of the CUT to automatically:
   a. identify within the CUT one or more dependencies contained in the CUT; and
   b. determine, for each given identified dependency, characteristics of code objects suitable to resolve the given identified dependency; and
(ii) create, for each individual identified dependency of the CUT, a Code Statement Segment (CSS) constructed to return a code object having the identified characteristics associated with the individual identified dependency or modify a code object to match the identified characteristics associated with the individual identified dependency, so as to generate a unit test including CSS's configured to resolve each of the one or more identified dependencies;

According to further embodiments, the processor executable code may further include observer method controller code adapted to cause the one or more processors to identify an observer method within the CUT, and/or within any CSS, which observer method indicates a value associated with a field written to by the CUT by a CSS.

According to further embodiments, the processor executable code may further include code execution processing logic to cause said one or more processors to execute within a sandbox environment the: (1) CUT, (2) CSS, and (3) an observer method.

According to further embodiments, the processor executable code may further include code execution processing logic to assess one or more functional parameters of the CUT and the CSS during execution. These parameters may be selected from the group consisting of: (1) code execution errors, (2) code execution exceptions, (3) values of data objects, (4) value transitions of data objects, and (5) code execution coverage.

According to further embodiments, the processor executable code may further include validation logic adapted to cause said one or more processors to validate a CSS for use as part of a unit test.

According to further embodiments, the processor executable code may further be adapted to operate in concert with said validation logic to cause said one or more processors to modify, replace or add isolation code, or prune a CSS, responsive to an output of said code execution assessment logic.

According to further embodiments, the processor executable code may further include code statement segment optimization logic adapted to cause said one or more processors to modify, replace or add isolation code, or prune a CSS, responsive to observer method outputs.

According to further embodiments, the processor executable code may further include code statement segment storage logic adapted to cause said one or more processors to store CSS's which have been validated or optimized.

According to further embodiments, the processor executable code may further include test coverage assessment logic adapted to cause said one or more processors to assess a cumulative code execution coverage provided by the stored code statement segments.

According to further embodiments, the processor executable code may further include a unit test publishing module adapted to cause said one or more processors to publish the stored code statement segments as a unit test upon the assessed cumulative code execution coverage reaching or exceeding a threshold level.

According to further embodiments, the processor executable code may further include one or more mocking engines.

According to further embodiments, the processor executable code may further be adapted to cause the one or more processors to:
 (i) analyze the at least one CUT, prior to execution of the CUT, and automatically identify within the CUT, by analyzing code lines of the CUT or metadata of the CUT, one or more fields to be read by the CUT; and
 (ii) generate at least one CSS constructed to modify at least one field identified by said code analyzing logic.

According to some embodiments, there may be provided a system for generating a unit test for software code to be tested (Code Under Test "CUT"), comprising a processor functionally associated with a digital memory, which digital memory stores processor executable code adapted to cause one or more processors to:
 (i) analyze code lines of the CUT, or metadata of the CUT, to automatically identify a field which will be read by the CUT during execution; and
 (ii) generate a unit test including a Code Statement Segment (CSS) constructed to modify the identified field, during execution of the unit test; wherein generating a unit test includes creating the CSS.

According to further embodiments, the processor executable code may be further adapted to cause the one or more processors to:
 identify a type of the identified field, so as to determine a type of value/constant suitable to populate the identified field;
 select for the unit test a value/constant of the type determined suitable to populate the field; and
 create the CSS to modify the field to the selected value/constant.

According to further embodiments, the processor executable code may be further adapted to cause the one or more processors to:
 identify values/constants within the CUT of the type determined suitable to populate the field; and
 select the value/constant for the unit test from the constants identified within the CUT.

According to further embodiments, the processor executable code may be further adapted to cause the one or more processors to select the value/constant for the unit test from the values/constants identified within the CUT based at least partially on an amount of times the selected value/constant appears within the CUT.

According to further embodiments, the processor executable code may be further adapted to cause the one or more processors to select the value/constant for the unit test, from the values/constants identified within the CUT, based at least partially on a proximity of a code statement of the CUT containing the selected value to a first code statement in a block of code statements uncalled in previous tests or a last code statement in a block of code statements called in previous tests.

According to further embodiments, the processor executable code may be further adapted to cause the one or more processors to select the value/constant for the unit test from the values/constants identified within the CUT based at least partially on an amount of times the selected value/constant appears within other Code Statement Segments created by said system for the unit test.

According to some embodiments, there may be provided a system for mutating a unit test for software code being tested (Code Under Test "CUT"), comprising a processor functionally associated with a digital memory, which digital memory stores processor executable code adapted to cause one or more processors to:
 a. monitor execution of a first unit test of the CUT, the first unit test including a Code Statement Segment (CSS) created to test the CUT;
 b. analyze a coverage of the CUT for the first unit test; and
 c. create, from the CSS, a mutated CSS designed to improve the coverage of the first unit test, wherein creating the mutated CSS is performed by modifying values within code statements of the CSS.

According to further embodiments, the processor executable code may be further adapted to cause the one or more processors to:
 identify, for each value being modified, a type of value suitable to replace the value being modified; and
 select, for each value being modified, a replacement value of the type determined suitable to replace the value being modified.

According to further embodiments, the processor executable code may be further adapted to cause the one or more processors to:
 identify values within the CUT of the type determined suitable to replace the value being modified; and
 select for at least one value being modified, a replacement value from the values identified within the CUT.

According to further embodiments, the processor executable code may be further adapted to cause the one or more processors to select the replacement value based at least partially on an amount of times the selected replacement value appears within the CUT.

According to further embodiments, the processor executable code may be further adapted to cause the one or more processors to select the replacement value based at least partially on a proximity of a code statement of the CUT containing the selected value to a first code statement in a block of code statements uncalled in previous tests or a last code statement in a block of code statements called in previous tests.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A system for generating a unit test for software code to be tested (Code Under Test "CUT"), said system comprising:
 a processor functionally associated with a digital memory, which digital memory stores processor executable code adapted to cause one or more processors to:
 (i) analyze code instructions of the CUT or metadata of the CUT to automatically:

a. identify within the CUT one or more dependencies contained in the CUT; and
b. determine, for each given identified dependency, characteristics of code objects suitable to resolve the given identified dependency; and
(ii) create, for each individual identified dependency of the CUT, a Code Statement Segment (CSS) constructed to return a code object having the identified characteristics associated with the individual identified dependency or modify a code object to match the identified characteristics associated with the individual identified dependency, so as to generate a unit test including CSS's configured to resolve each of the one or more identified dependencies.

2. The system according to claim 1, wherein said processor executable code further includes observer method controller code adapted to cause said one or more processors to identify an observer method within the CUT, or within any CSS, which observer method indicates a value associated with a field modified by the CUT.

3. The system according to claim 2, further comprising code execution processing logic to cause said one or more processors to execute within a sandbox environment the: (1) CUT, (2) CSS, and (3) an observer method.

4. The system according to claim 3, further comprising code statement segment optimization logic adapted to cause said one or more processors to modify, replace or add isolation code, or prune a CSS, responsive to outputs of the observer method.

5. The system according to claim 1, further comprising validation logic adapted to cause said one or more processors to validate a CSS for use as part of a unit test.

6. The system according to claim 1, further comprising code statement segment storage logic adapted to cause said one or more processors to store CSS's.

7. The system according to claim 6, further comprising test coverage assessment logic adapted to cause said one or more processors to assess a cumulative code execution coverage provided by the stored code statement segments.

8. The system according to claim 1, further comprising one or more mocking engines.

9. The system according to claim 1, wherein:
said processor executable code is further adapted to cause the one or more processors to:
(i) analyze the CUT, prior to execution of the CUT, and automatically identify within the CUT, by analyzing code lines of the CUT or metadata of the CUT, one or more fields to be read by the CUT; and
(ii) generate at least one CSS constructed to modify at least one field identified by said code analyzing logic.

10. A system for generating a unit test for software code to be tested (Code Under Test "CUT"), said system comprising:
a processor functionally associated with a digital memory, which digital memory stores processor executable code adapted to cause one or more processors to:
(i) analyze code lines of the CUT, or metadata of the CUT, to automatically identify a field which will be read by the CUT during execution;
(ii) identify a type of the identified field, so as to determine a type of value suitable to populate the identified field;
(iii) identify values within the CUT of the type determined suitable to populate the field;
(iv) select the value for the CSS from the values identified within the CUT, based at least partially on an amount of times the selected value appears within the CUT; and
(v) generate a unit test including a Code Statement Segment (CSS) constructed to modify the identified field, during execution of the unit test;
wherein generating a unit test includes creating the CSS.

11. A system for mutating a unit test for software code being tested (Code Under Test "CUT"), said system comprising:
a processor functionally associated with a digital memory, which digital memory stores processor executable code adapted to cause one or more processors to:
a. monitor execution of a first unit test of the CUT, the first unit test including a Code Statement Segment (CSS) created to test the CUT;
b. analyze a coverage of the CUT for the first unit test;
c. create, from the CSS, a mutated CSS designed to improve the coverage of the first unit test, wherein creating the mutated CSS is performed by modifying values within code statements of the CSS
and wherein said modifying values within code statements includes:
identifying, for each value being modified, a type of value suitable to replace the value being modified;
identifying values within the CUT of the type determined suitable to replace the value being modified and
selecting from the identified values, for each value being modified, a replacement value of the type determined suitable to replace the value being modified based at least partially on an amount of times the selected replacement value appears within the CUT.

* * * * *